(12) United States Patent
Zhang et al.

(10) Patent No.: US 7,020,394 B2
(45) Date of Patent: Mar. 28, 2006

(54) METHOD AND APPARATUS FOR PATH SELECTION AND WAVELENGTH ASSIGNMENT IN AN OPTICAL NETWORK

(75) Inventors: Hongbiao Zhang, Westford, MA (US); Frank J. Effenberger, Freehold, NJ (US); Kyoo J. Lee, Westford, MA (US)

(73) Assignee: Quantum Bridge Communications, Inc., Andover, MA (US)

(*) Notice: Subject to any disclaimer, the term of this patent is extended or adjusted under 35 U.S.C. 154(b) by 525 days.

(21) Appl. No.: 09/932,850

(22) Filed: Aug. 17, 2001

(65) Prior Publication Data

US 2003/0035166 A1    Feb. 20, 2003

(51) Int. Cl.
*H04B 10/08* (2006.01)

(52) U.S. Cl. .............. 398/25; 398/57; 398/58

(58) Field of Classification Search .......... 398/43–103, 398/25
See application file for complete search history.

(56) References Cited

U.S. PATENT DOCUMENTS

| | | | | |
|---|---|---|---|---|
| 5,940,372 A | | 8/1999 | Bertin et al. ............... | 370/238 |
| 5,963,546 A | | 10/1999 | Shoji ......................... | 370/255 |
| 6,016,306 A | | 1/2000 | Le Boudec et al. ......... | 370/235 |
| 6,260,072 B1 | | 7/2001 | Rodriguez-Moral ........ | 709/241 |
| 6,304,349 B1 | * | 10/2001 | Alanyall et al. ............ | 398/9 |
| 6,529,301 B1 | * | 3/2003 | Wang ........................... | 398/82 |
| 6,757,494 B1 | * | 6/2004 | Lu et al. ...................... | 398/25 |
| 6,798,993 B1 | * | 9/2004 | Adams et al. ................ | 398/74 |
| 2002/0018264 A1 | * | 2/2002 | Kodialam et al. .......... | 359/128 |
| 2003/0099014 A1 | * | 5/2003 | Egner et al. ................. | 359/124 |

OTHER PUBLICATIONS

Chlamtac, I., et al., Lightpath (Wavelength) Routing in Large WDM Networks, *IEEE Journal on Selected Areas in Communications*, 14(5): 909-913, (Jun. 1996).

Cormen, T.H., et al., "25.2 Dijkstra's Algorithm." In *Introduction to Algorithms*, eds. (NY: McGraw-Hill), pp. 527-531 (1992).

* cited by examiner

*Primary Examiner*—Agustin Bello

(57) ABSTRACT

A method and apparatus for determining a shortest path between a source node and a destination node in an optical network of nodes interconnected with optical transmission links is disclosed. A wavelength graph is used to represent an optical network as a set of electronic nodes and optical channel nodes corresponding to the network nodes with a set of internal links and optical channel links. The electronic node represents the electronic switching fabric that interconnects OEO equipment within a physical node. A single-source shortest path algorithm (e.g., Dijkstra's algorithm) is applied to the wavelength graph to determine a shortest path. The transformation of the network representation to include the electronic node greatly reduces the number of links in the wavelength graph and significantly increases the computational efficiency.

9 Claims, 7 Drawing Sheets

METHOD AND APPARATUS FOR PATH SELECTION AND WAVELENGTH ASSIGNMENT IN AN OPTICAL NETWORK

BACKGROUND

There exist numerous algorithms for the standard routing problem, in which a network is modeled as a directed graph, and it is assumed that traffic from one link can always be relayed to its consecutive link. Among these algorithms, the most efficient one is the well-known Dijkstra algorithm, which has been adopted for use in many of the common link-state routing protocols, such as Open Shortest Path First (OSPF), Intermediate System to Intermediate System (IS-IS), and Private Network to Network Interface (PNNI).

An important class of routing problem pertains to dynamically searching for an optimal lightpath between two edge nodes of an optical network. The path consists of one or more optical links, each link having a dedicated wavelength for the path. The wavelength, or optical channel, assigned to the path may not be the same on every link. Every time the wavelength assignment changes along the path, special wavelength conversion equipment, e.g., an optical-electrical-optical (OEO) conversion device, is required.

In optical network routing, both routing and wavelength assignment have to be considered simultaneously. In addition, since there may not be a full OEO conversion capability at every node, traffic arriving at a node on one wavelength of a link may not be able to be relayed to another wavelength of a consecutive link of the lightpath. Therefore, the standard graph model cannot be used directly.

In "Lightpath (Wavelength) Routing in Large WDM Networks", Chlamtac et. al., IEEE Journal on Selected Areas in Communications, Vol. 14, No. 5, June 1996, it is proposed to convert the original graph to a new, matrix-like structure with m rows and N columns (N and m being the number of network nodes and wavelengths respectively), with each column corresponding to a node and each row corresponding to a wavelength. Links in the horizontal direction represent connectivity between neighboring nodes, using the available wavelengths on the optical fibers that interconnect the physical nodes. Links in the vertical direction represent connectivity between different wavelengths within a single physical node that are made available by OEO transmitters and receivers. The resulting graph is called a "wavelength graph." Chlamtac et al. further derive a routing and wavelength assignment algorithm, referred to as the Shortest Path Algorithm for the Wavelength Graph (SPAWG), with computation complexity of $O\{(N+m)Nm)\}$. However, the SPAWG algorithm is understood to contain an error and therefore is not practically available. Moreover, the SPAWG algorithm is not Dijkstra-based and thus is difficult to integrate with standard routing protocols such as OSPF.

SUMMARY

A method used to find the optimal path in an optical network should ensure that sufficient OEO transmitters and receivers, if necessary, are available along the path. In addition, the method needs to find the lowest cost path, where the cost typically reflects the usage of equipment and facilities along the path. The method should also be simple enough to execute in real time, as the paths need to be calculated in real time as users generate connection requests.

The present approach enables an optical switch to dynamically find an optimal path, with a wavelength or optical channel and OEO equipment (if necessary) dedicated to the path on each link. Using a wavelength graph to represent the optical network, the approach represents as an electronic node the electronic switching fabric that interconnects OEO equipment within a physical node. The transformation of the network representation to include the electronic node greatly reduces the number of links in the wavelength graph and significantly increases the computational efficiency.

Accordingly, a method of determining a shortest path between a source node and a destination node in an optical network that has plural network nodes interconnected with optical transmission links includes representing the network as a uni-directional graph G=<V, E> with V defining a set of network nodes and E defining a set of uni-directional optical transmission links. The graph G is transformed to a wavelength graph G'=<V', E'> with V' defining a set of electronic nodes and optical channel nodes corresponding to the network nodes in set V and with E' defining a set of internal links and optical channel links. The optical channel links correspond to the optical transmission links in set E. A single-source shortest path algorithm (e.g., Dijkstra's algorithm) is applied to the graph G' to determine a shortest path corresponding to an optimal path on graph G.

The transforming features assigning an electronic node to each network node that represents an electronic switching fabric interconnecting optical-electrical-optical (OEO) transmitters and receivers of the network node. Optical channel nodes are assigned to each network node that represent an optical cross-connect for an optical channel available at the network node. For each network node, an internal link is assigned from the electronic node to each optical channel node if an associated OEO transmitter is available for the corresponding optical channel and an internal link is assigned to the electronic node from each optical channel node if an associated OEO receiver is available for the corresponding optical channel. For each optical transmission link, an optical channel link is assigned between a pair of optical channel nodes of corresponding network nodes if the corresponding optical channel is available on the associated optical transmission link.

Costs are assigned to the internal links in relation to OEO conversion costs. Costs are assigned to the optical channel links in relation to costs of the corresponding optical transmission links.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
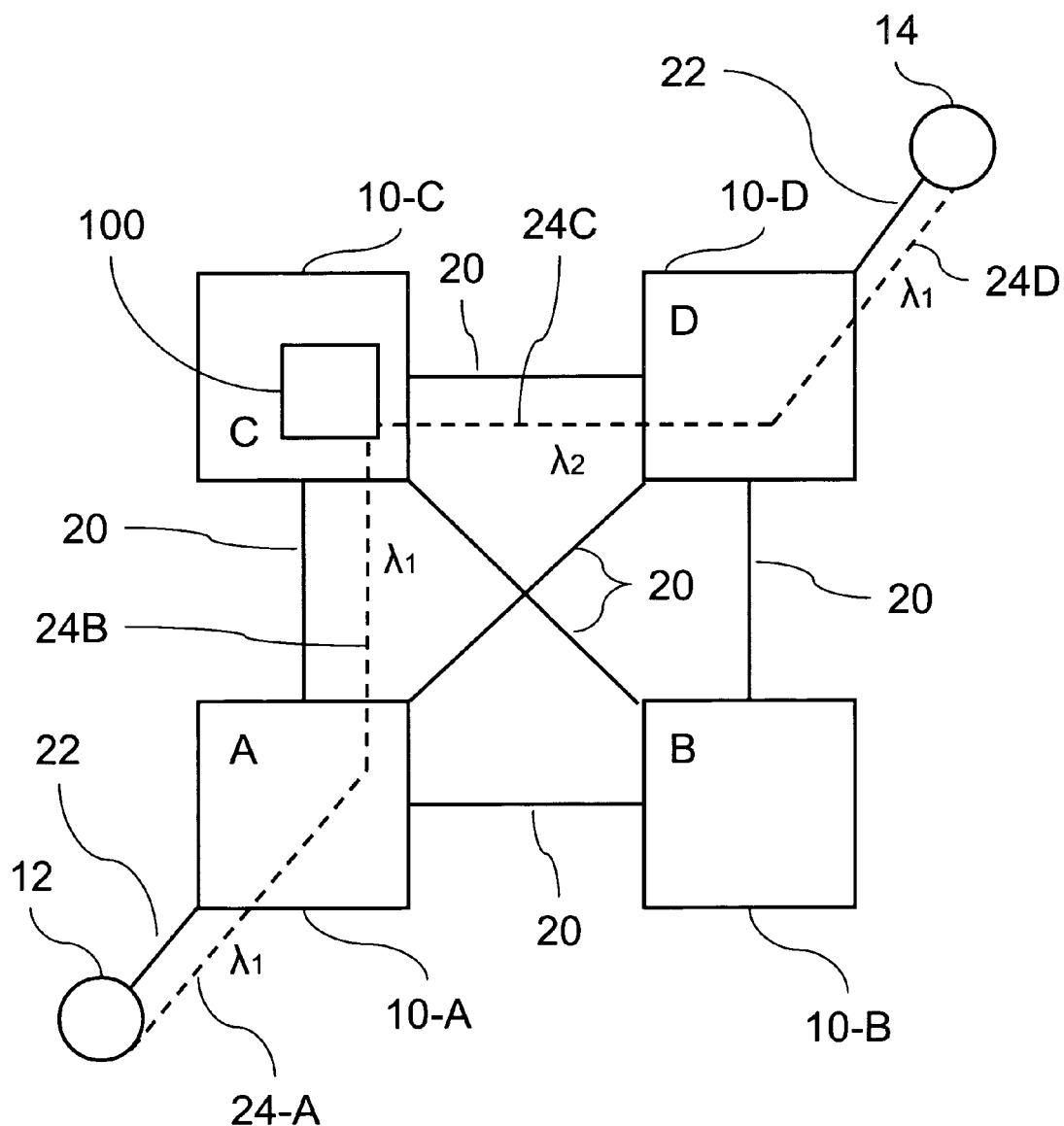
FIG. 1 illustrates an optical network of nodes interconnected with optical transmission links.

FIG. 1 illustrates an exemplary optical network. The network includes network nodes 10-A, 10-B, 10-C, 10-D interconnected with optical transmission links 20. A lightpath interconnects edge nodes 12, 14 through network nodes A, C and D over links 20 and edge links 22. The lightpath includes optical channels 24A, 24B, 24C, 24D carried on the respective links. In particular, optical channels 24A and 24B occupy wavelength $\lambda_1$ and do not require any OEO conversion at node A. At node C, OEO equipment 100 converts wavelength $\lambda_1$ of optical channel 24B to wavelength $\lambda_2$ of optical channel 24C. Optical channels 24C and 24D occupy wavelength $\lambda_2$ and do not require any OEO conversion at node D.

Figure 2:
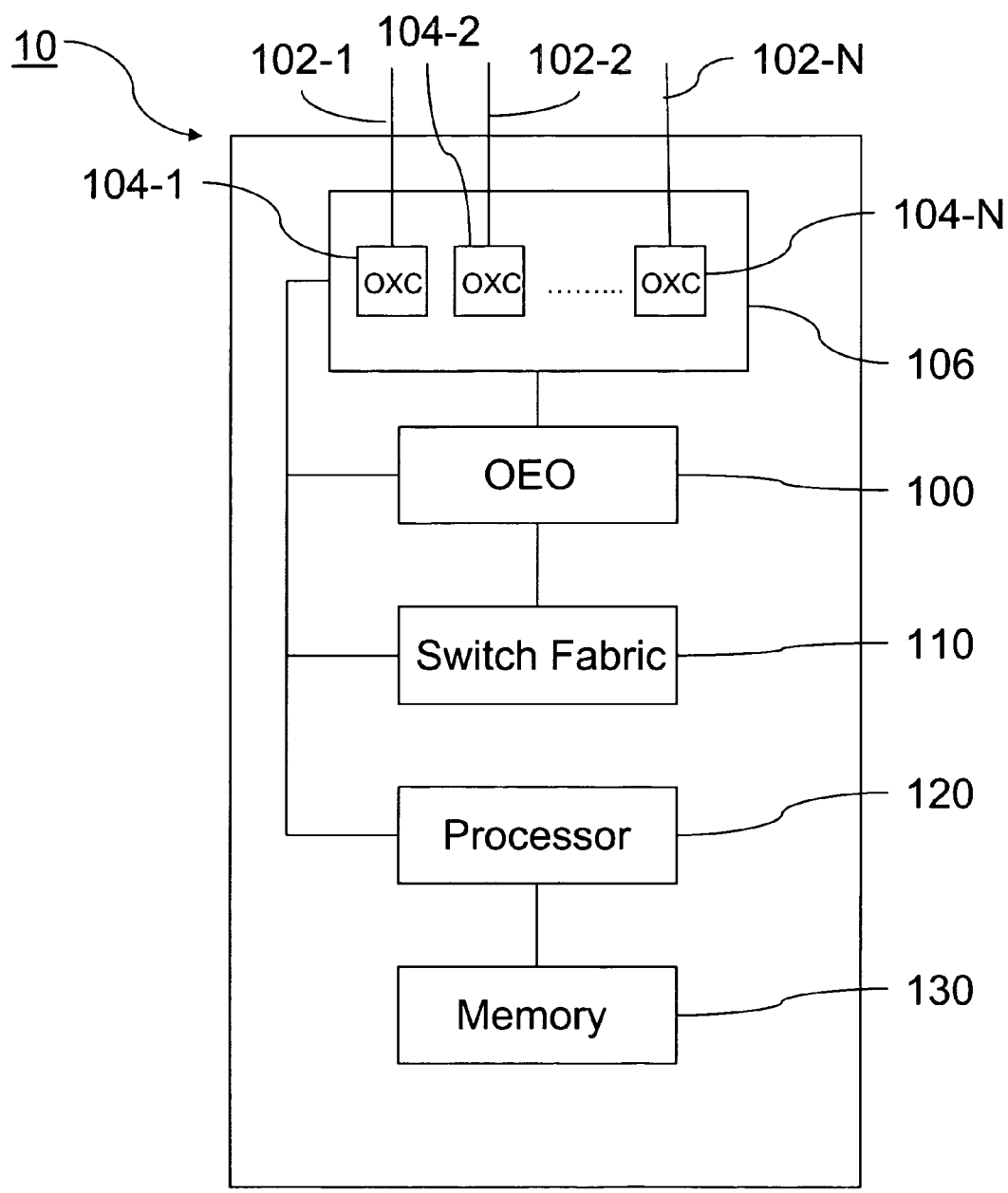
FIG. 2 is a block diagram of a network node in the network of FIG. 1.

FIG. 2 shows a network node 10 for use in the optical network of FIG. 1. The network node includes OEO transmitters/receivers 100, an electronic switching fabric 110, a processor 120 and memory 130. The switching fabric 110 provides interconnection of the OEO transmitters and receivers under control of the processor 120. In an embodiment, the memory 130 includes program code for determining an optimal path through the network, as described herein.

The network node 10 further includes an optical cross-connect (OXC) 106 which connect to ports 102-1, 102-2, ... ,102-N. Each port connects to an incoming or outgoing transmission link. The OXC 106 includes OXC planes 104-1, 104-2, ... ,104-M. Each of the OXC planes is used to switch or connect data signals from an incoming transmission link to an outgoing transmission link using one wavelength. For a path that uses, e.g., wavelength $\lambda_1$ on two consecutive links e and f, traffic is switched from one port (connecting to link e) to another port (connecting to link f) using an OXC-plane $\lambda_1$. If a path uses two different wavelengths, e.g., $\lambda_1$ and $\lambda_2$, on two consecutive links g and h, then traffic arriving from link g passes through OXC-plane $\lambda_1$ to the OEO equipment 100, through the switching fabric 110 and back to the OEO equipment, then to OXC-plane $\lambda_2$, and leaves the node on link h. Thus, an optical channel node in a network node represents an OXC-plane for the corresponding optical channel.

The present approach uses a wavelength graph to represent a network of nodes. In addition, an "electronic node" is defined to represent the electronic switching fabric that physically interconnects OEO receivers with OEO transmitters within a physical node. As a result, the number of links in the wavelength graph is greatly reduced, and the computational efficiency is significantly increased. A method of the present approach is now described.

An optical network, such as the network shown in FIG. 1, can be modeled as a uni-directional graph $G=<V, E>$ with V and E representing the set of network nodes and unidirectional links, respectively. The total number of wavelengths available to each network node is given as m. The present approach, as described in the following pseudocode, derives a wavelength graph $G'=<V', E'>$ and finds an optimal path through $G'$:

step 1: for any $v \in V$
   define an electronic node $v_0 \in V'$;
   for i:=1 ... m
   define an optical channel node $v_i \in V'$;
   if an OEO transmitter is available for optical channel $\lambda_i$
     define a link $(v_0, v_i) \in E'$ with a cost of y/2;
   if an OEO receiver is available for optical channel $\lambda_i$
     define a link $(v_i, v_0) \in E'$ with a cost of y/2;
step 2: for any $f \in E$, assume $f=(v, w)$ with a cost of x and v, $w \in V$
   for i:=1 ... m
   if optical channel $\lambda_i$ is available on f
     define a link $(v_i, w_i) \in E'$ with a cost of x;
step 3: apply Dijkstra's algorithm on $G'$ to search for a shortest path, which corresponds to an optimal path on G.

In the present approach, m optical channel nodes $v_i$ (i=1, 2, ... , m) and an electronic node $v_0$ are defined for any node v in V. Optical channel node $v_i$ represents OXC plane $\lambda_i$ of node v. Electronic node $v_0$ represents the electronic switching fabric in node v. An internal link is defined from $v_i$ to $v_0$ if and only if there is an available OEO receiver for optical channel $\lambda_i$. Likewise, an internal link is defined from $v_0$ to $v_i$ if and only if there is an available OEO transmitter for optical channel $\lambda_i$.

If there is an optical transmission link $f \in E$ connecting from network node v to network node w, then for any wavelength available on link f, say, $\lambda_i$ (i=1, 2, ... m), an optical channel link is defined from optical channel node $v_i$ to $w_1$. The cost of each optical channel link is defined as the corresponding physical link cost.

In this way a new graph $G'$ is obtained, with costs of both physical links and OEO conversion on graph G converted to costs of only links (i.e., internal and optical channel) on graph $G'$. Therefore, any path consisting of physical nodes with a wavelength assigned to each link is converted to a lightpath consisting of optical channel nodes and possibly electronic nodes.

Having transformed the graph G to a wavelength graph $G'$, the standard Dijkstra algorithm can be run on graph $G'$ to search for a shortest path, which corresponds to an optimal path on the original graph G. It should be understood that other single-source shortest path algorithms, e.g., Bellman-Ford, can be applied to search for a shortest path on graph $G'$.

Figure 3:
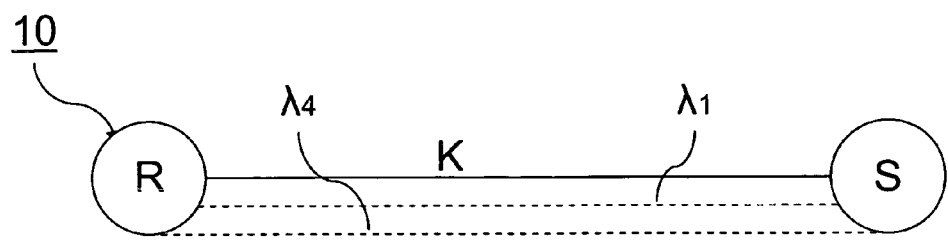
FIG. 3 illustrates a pair of connected nodes.

The foregoing approach to transformation of the wavelength graph is now described with an example. FIG. 3 illustrates an example of two nodes R, $S \in V$ with m=4 that are connected by unidirectional physical link k having link cost x. In this case, only optical channels $\lambda_1$ and $\lambda_4$ are available on the link k.

Figure 4:
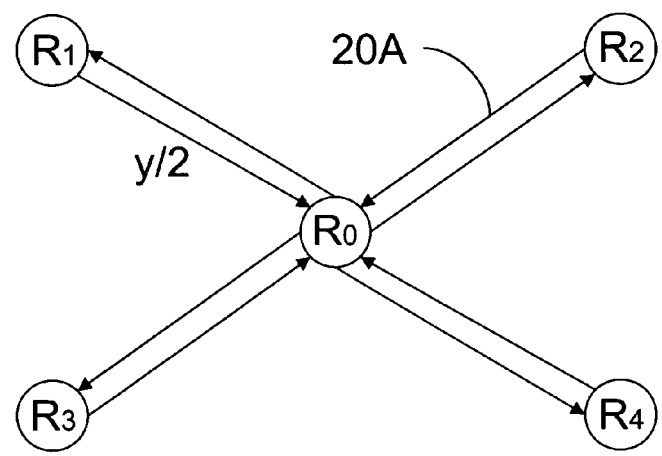
FIG. 4 illustrates a transformation of one of the nodes in FIG. 3 according to the present approach.

FIG. 4 illustrates the transformation in graph $G'$ of node R wherein all OEO transmitters and receivers are available. The node R is represented as optical channel nodes $R_1$, $R_2$, $R_3$, $R_4$ and electronic node $R_0$. The full interconnection between the optical channel nodes and the electronic node within node R is indicated by internal links 20A each having link cost y/2.

Figure 5:
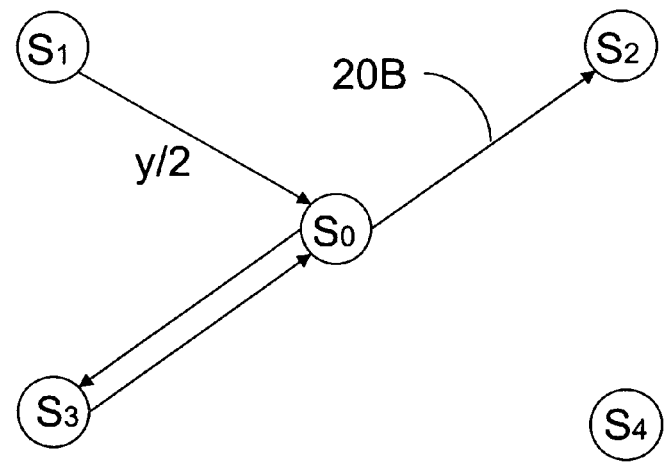
FIG. 5 illustrates a transformation of another of the nodes in FIG. 3 according to the present approach.

FIG. 5 illustrates the transformation in graph $G'$ of node S wherein OEO transmitters and receivers are only partially available. In particular, only OEO transmitters for optical channels $\lambda_2$ and $\lambda_3$ are available, and only OEO receivers for optical channels $\lambda_1$ and $\lambda_3$ are available in node S. Note that there is no OEO equipment available for optical channel $\lambda_4$.

Rather, OXC-plane $\lambda_4$ is used to switch traffic from incoming transmission links to outgoing transmission links without wavelength conversion.

The node S is represented as optical channel nodes $S_1$, $S_2$, $S_3$, $S_4$ and electronic node $S_0$. Interconnection between the optical channel nodes and the electronic node within node S is indicated by internal links 20B each having link cost y/2. The internal link cost y/2 can vary link by link within a node and can vary from node to node. However, in most cases, the same OEO equipments are used in the same node and therefore, costs associated with them are the same. It is more likely to have such costs vary from node to node.

Since there is no OEO equipment available for optical channel $\lambda_4$, there are no corresponding internal links between optical channel node $S_4$ and electronic node $S_0$.

Figure 6:
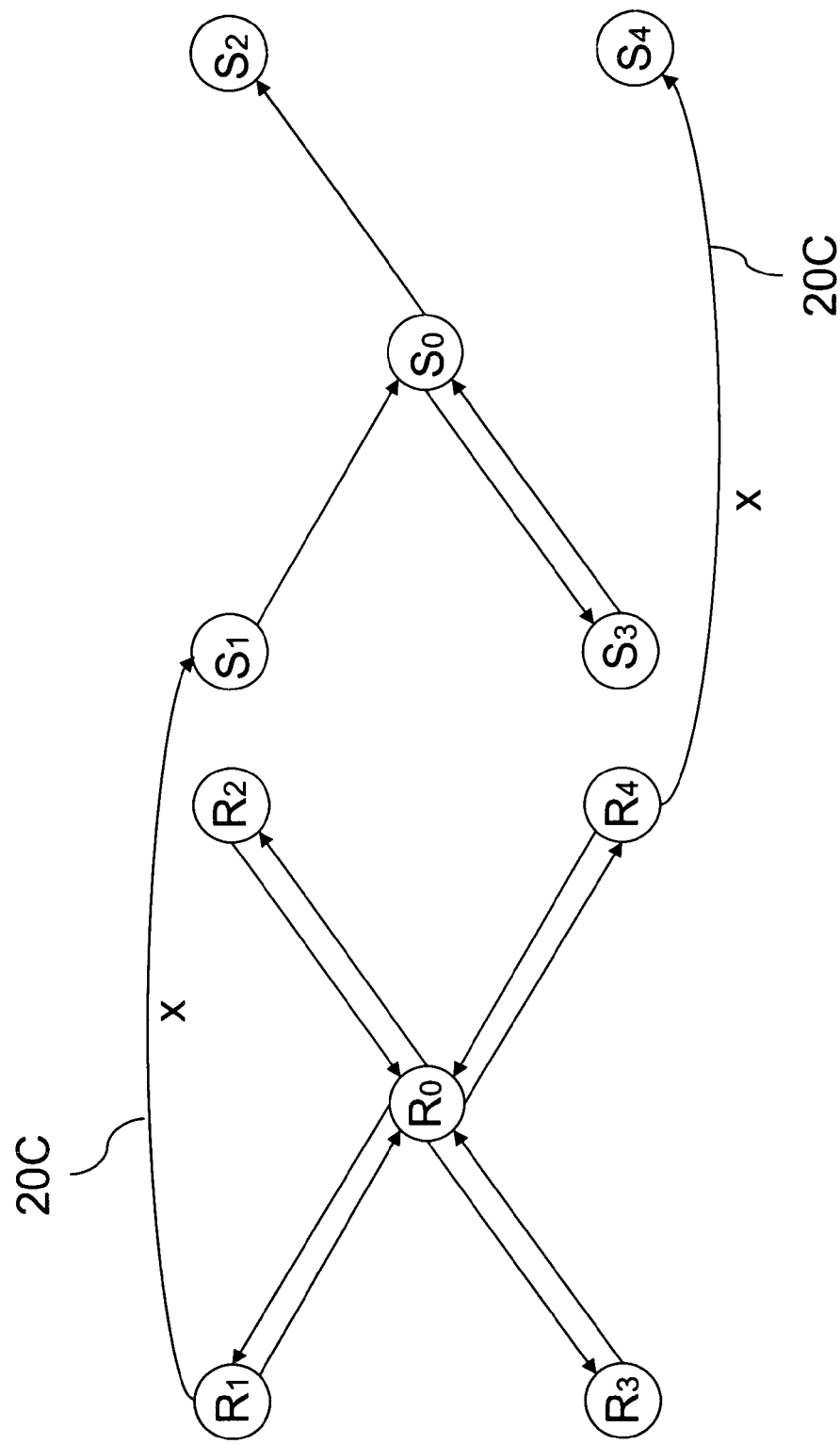
FIG. 6 illustrates interconnection of the transformed nodes of FIGS. 4 and 5.

FIG. 6 illustrates the interconnection of network nodes R and S as represented in the transformed wavelength graph G'. In particular, optical channel links 20C are indicated between optical channel nodes $R_1$ and $S_1$ and between optical channel nodes $R_4$ and $S_4$, respectively, each having link cost x. The optical channel link cost x can vary link by link between the same nodes and for different transmission links.

The interconnection between optical channel nodes shown in FIG. 6 is consistent with the configuration of FIG. 3 wherein only wavelengths $\lambda_1$ and $\lambda_4$ are available on optical transmission link k.

Figure 7A:
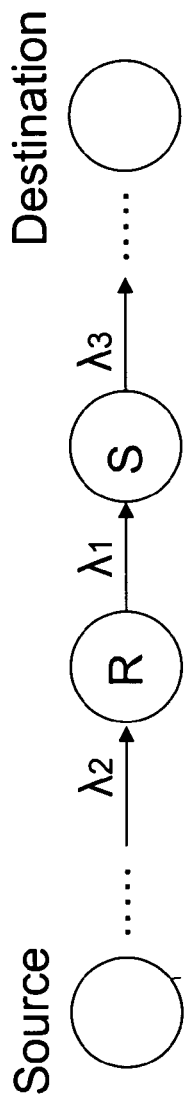
FIG. 7A illustrates a first lightpath that connects through the nodes of FIG. 3.

FIG. 7A shows a lightpath that connects from a source node to a destination node through a network that includes the physical nodes R and S of FIG. 3. In particular, an optical channel received at node R on wavelength $\lambda_3$ is converted to wavelength $\lambda_1$ for connection to node S. At node S, wavelength $\lambda_1$ is converted to wavelength $\lambda_2$.

Figure 7B:
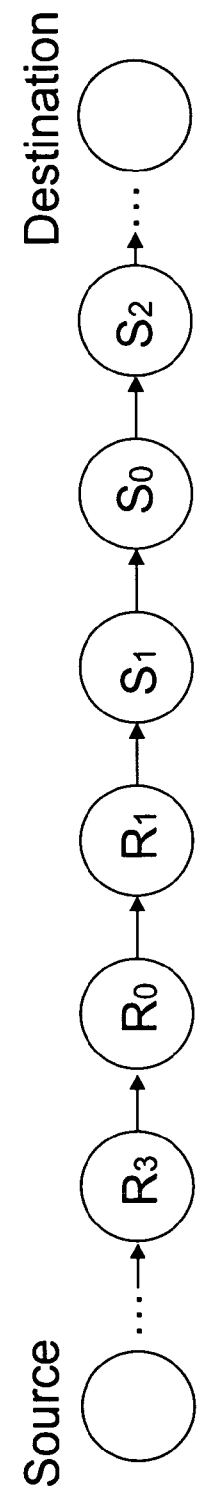
FIG. 7B illustrates the lightpath of FIG. 7A transformed according to the present approach.

FIG. 7B illustrates the lightpath of FIG. 7A transformed to the wavelength graph G' according to the present approach with wavelength conversions indicated at network nodes R and S. In particular, the wavelength conversion from $\lambda_3$ to $\lambda_1$ is indicated as successive links from optical channel node $R_3$ to electronic node $R_0$ and from node $R_0$ to optical channel node $R_1$. Likewise, the wavelength conversion from $\lambda_1$ to $\lambda_2$ is indicated as successive links from optical channel node $S_1$ to electronic node $S_0$ and from node $S_0$ to optical channel node $S_2$.

Figure 8A:
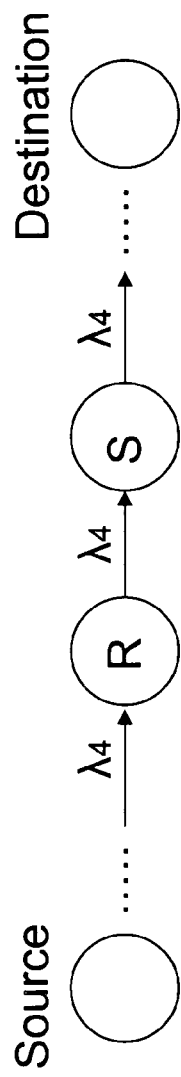
FIG. 8A illustrates a second lightpath that connects through the nodes of FIG. 3.
Figure 8B:
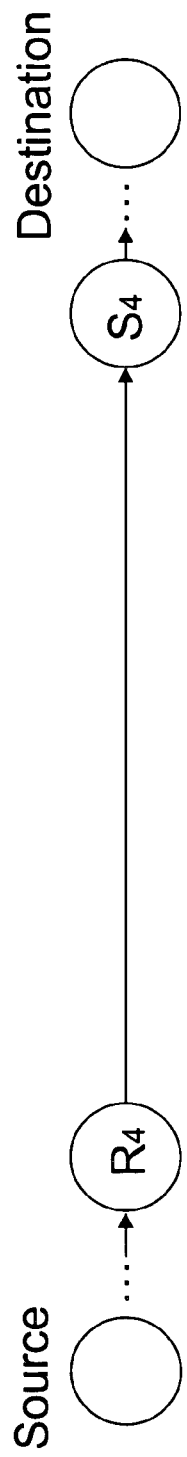
FIG. 8B illustrates the lightpath of FIG. 8A transformed according to the present approach.

FIG. 8A shows a second lightpath that connects from a source node to a destination node through a network that includes the physical nodes R and S of FIG. 3. In particular, an optical channel received at node R on wavelength $\lambda_4$ passes to node S without experiencing wavelength conversion at either node. FIG. 8B illustrates the lightpath of FIG. 8A transformed to the wavelength graph G' according to the present approach. In particular, since there is no wavelength conversion at the nodes R and S, the links are simply shown as connecting from optical channel node $R_4$ to optical channel node $S_4$.

Figure 9:
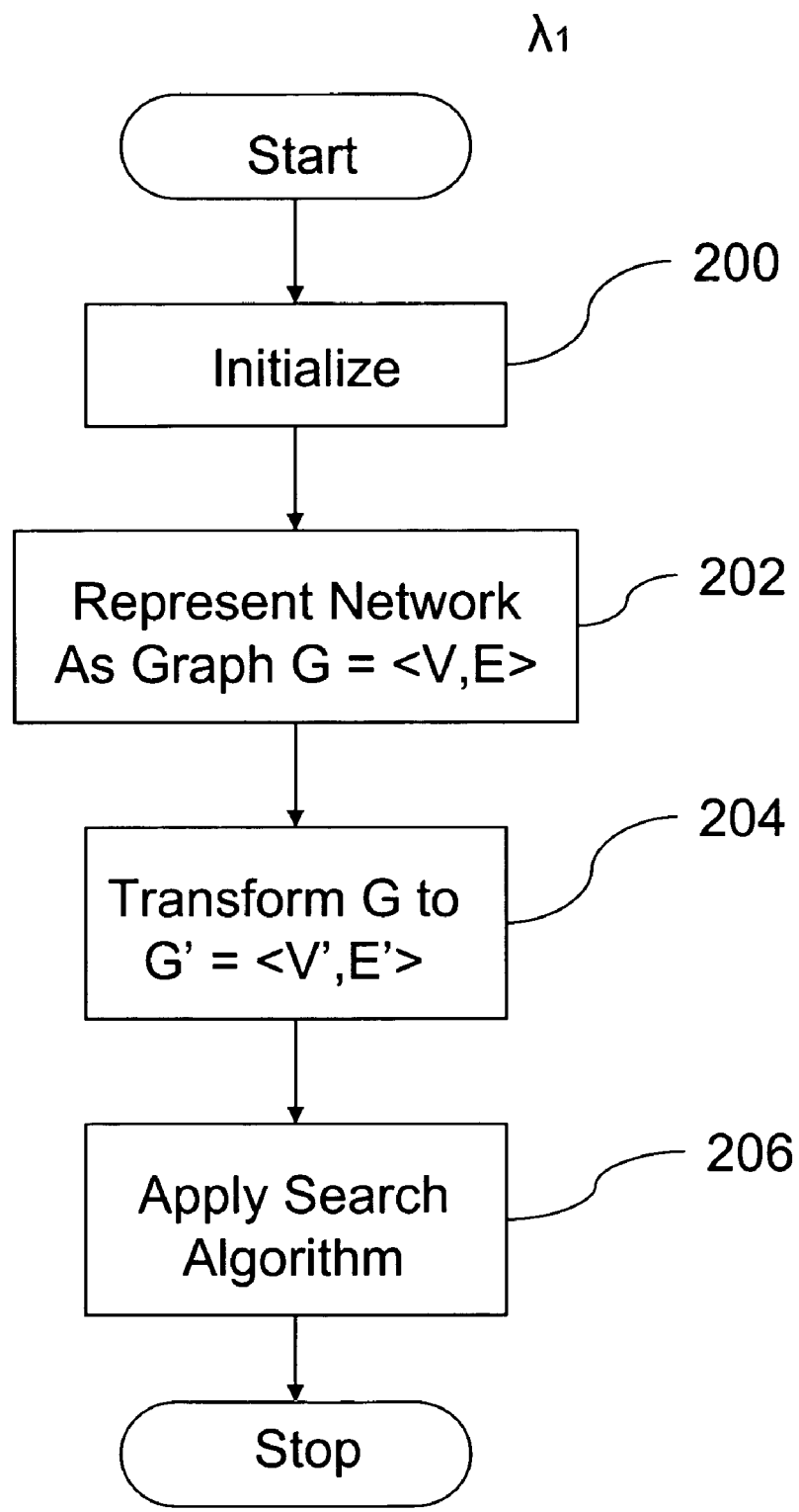
FIG. 9 is a flow diagram illustrating a method of the present approach.

FIG. 9 is a flow diagram illustrating the method of the present approach that can be a process performed in one or more network nodes or by a separate network management computer. At 200, information relating to the topology of the network including links and costs is initialized or retrieved from a data base. At 202, the network topology is represented as a graph G=<V, E>. The graph G is transformed to a wavelength graph G'=<V', E'> as defined above at 204. At 206, an optimal path is determined by applying the Dijkstra algorithm to the wavelength graph G'.

The computation complexity of the present approach is $O\{(mL) \times \log_2(mN)\}$, where m is the number of wavelengths, L is the number of links, and N is the number of nodes. In this manner, the present approach corrects and improves the SPAWG method so that a lightpath can be found efficiently and optimally. Since the present approach is Dijkstra-based, it can be integrated easily with standard link-state routing protocols such as OSPF.

The present approach can be used in any optical network with or without OEO conversions, including the two extreme cases in which an optical network either does not have OEO capability at all or has full OEO capability. On the other hand, an optical network with partial OEO capability combines the advantages of the two extreme networks, and achieves cost effectiveness and low blocking probability at the same time. It is for this type of network that the proposed algorithm is particularly suited.

The approach for determining the optimal path through an optical network can be used for both connectionless and connection-oriented networks. In a connection-oriented network, routing decisions need to be made at connection setup. The present approach can be used to pre-compute paths from any source to any destination. The pre-computed paths can be stored in memory or a data base for access upon each connection request. However, after the next connection request that uses a pre-computed path, the optical channel and OEO availability information may have changed and thus the pre-computed paths may no longer be usable. The paths typically need to be recalculated after each successful connection establishment.

In a connection-oriented environment, routing decisions are made at a lower frequency, compared to a connectionless network in which a routing/forwarding decision typically needs to be made for every packet.

In a preferred embodiment, a path calculation is made whenever there is a new connection request, as the frequency of new connection requests is typically very low.

In any case, an update of network topology including changes to link costs and OEO/optical channel availability information is needed regularly. These update functions can be provided either in a centralized manner using a separate management station that physically connects to every network node, or in a distributed manner by each of the network nodes using standard routing protocols such as OSPF or IS-IS.

It will be apparent to those of ordinary skill in the art that methods disclosed herein may be embodied in a computer program product that includes a computer usable medium. For example, such a computer usable medium can include a readable memory device, such as a hard drive device, a CD-ROM, a DVD-ROM, or a computer diskette, having computer readable program code segments stored thereon. The computer readable medium can also include a communications or transmission medium, such as a bus or a communications link, either optical, wired, or wireless, having program code segments carried thereon as digital or analog data signals.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of determining a shortest path between a source node and a destination node in an optical network having plural network nodes interconnected with optical transmission links, the method comprising:

assigning an electronic node to each network node, the electronic node representing an electronic switching fabric interconnecting optical-electrical-optical (OEO) transmitters and receivers of the network node;

assigning optical channel nodes to each network node, each optical channel node representing an optical cross-connect for an optical channel available at the network node;

for each network node, assigning an internal link from the electronic node to each optical channel node only if an associated OEO transmitter is available for the corresponding optical channel associated with a particular one of the available wavelengths $\lambda_1$ through $\lambda_m$, and assigning an internal link to the electronic node from each optical channel node only if an associated OEO receiver is available for the corresponding optical channel associated with a particular one of the available wavelengths $\lambda_1$ through $\lambda_m$;

for each optical transmission link, assigning an optical channel link between a pair of optical channel nodes of corresponding network nodes only if the corresponding optical channel is available on the associated optical transmission link; and assigning costs to the internal links and the optical channel links.

2. The method of claim 1 wherein the costs assigned to the internal links are related to OEO conversion costs.

3. The method of claim 1 wherein the costs assigned to the optical channel links are related to costs of the corresponding optical transmission links.

4. The method of claim 1 wherein applying the single-source shortest path algorithm includes applying Dijkstra's algorithm.

5. Apparatus for a network node in a network having plural nodes interconnected with optical transmission links, the apparatus comprising:

a processor;

a memory connected to the processor;

a plurality of optical-electrical-optical (OEO) transmitters and receivers; and a computer program, in the memory, for:

assigning an electronic node to each network node, the electronic node representing an electronic switching fabric interconnecting optical-electrical-optical (OEO) transmitters and receivers of the network node;

assigning optical channel nodes to each network node, each optical channel node representing an optical cross-connect for an optical channel available at the network node;

for each network node, assigning an internal link from the electronic node to each optical channel node only if an associated OEO transmitter is available for the corresponding optical channel associated with a particular one of the available wavelengths $\lambda_1$ through $\lambda_m$, and assigning an internal link to the electronic node from each optical channel node only if an associated OEO receiver is available for the corresponding optical channel associated with a particular one of the available wavelengths $\lambda_1$ through $\lambda_m$;

for each optical transmission link, assigning an optical channel link between a pair of optical channel nodes of corresponding network nodes only if the corresponding optical channel is available on the associated optical transmission link; and assigning costs to the internal links and the optical channel links.

6. The apparatus of claim 5 wherein the costs assigned to the internal links are related to OEO conversion costs.

7. The apparatus of claim 5 wherein the costs assigned to the optical channel links are related to costs of the corresponding optical transmission links.

8. A computer program product for determining an optimal path between a source node and a destination node in an optical network having plural network nodes interconnected with optical transmission links, the computer program product comprising a computer usable medium having computer readable code thereon, including program code which:

assigns an electronic node to each network node, the electronic node representing an electronic switching fabric interconnecting optical-electrical-optical (OEO) transmitters and receivers of the network node;

assigns optical channel nodes to each network node, each optical channel node representing an optical cross-connect for an optical channel available at the network node;

assigns an internal link from the electronic node to each optical channel node only if an associated OEO transmitter is available for the corresponding optical channel associated with a particular one of the available wavelengths $\lambda_1$ through $\lambda_m$, and assigning an internal link to the electronic node from each optical channel node only if an associated OEO receiver is available for the corresponding optical channel associated with a particular one of the available wavelengths $\lambda_1$ through $\lambda_m$;

assigns an optical channel link between a pair of optical channel nodes of corresponding network nodes only if the corresponding optical channel is available on the associated optical transmission link;

assigns costs to the internal links and the optical channel links; and selects an optimal path by applying a single-source shortest path algorithm.

9. A computer data signal comprising a code segment for determining an optimal path between a source node and a destination node in an optical network having plural network nodes interconnected with optical transmission links, the computer data signal including instructions to:

assign an electronic node to each network node, the electronic node representing an electronic switching fabric interconnecting optical-electrical-optical (OEO) transmitters and receivers of the network node;

assign optical channel nodes to each network node, each optical channel node representing an optical cross-connect for an optical channel available at the network node;

assign an internal link from the electronic node to each optical channel node only if an associated OEO transmitter is available for the corresponding optical channel associated with a particular one of the available wavelengths $\lambda_1$ through $\lambda_m$, and assigning an internal link to the electronic node from each optical channel node only if an associated OEO receiver is available for the corresponding optical channel associated with a particular one of the available wavelengths $\lambda_1$ through $\lambda_m$;

assign an optical channel link between a pair of optical channel nodes of corresponding network nodes only if the corresponding optical channel is available on the associated optical transmission link;

assign costs to the internal links and the optical channel links; and select an optimal path by applying a single-source shortest path algorithm.

* * * * *